United States Patent [19]

Bealkowski et al.

[11] Patent Number: 5,022,077
[45] Date of Patent: Jun. 4, 1991

[54] APPARATUS AND METHOD FOR PREVENTING UNAUTHORIZED ACCESS TO BIOS IN A PERSONAL COMPUTER SYSTEM

[75] Inventors: Richard Bealkowski, Delray Beach; John W. Blackledge, Jr., Boca Raton; Doyle S. Cronk, Boca Raton; Richard A. Dayan, Boca Raton; Jerry D. Dixon, Boca Raton; Scott G. Kinnear, Boca Raton; George D. Kovach, Boca Raton; Andrew B. McNeill, Deerfield Beach, all of Fla.; Matthew S. Palka, Jr., Raleigh, N.C.; Robert Sachsenmaier; Edward I. Wachtel, both of Boca Raton, Fla.; Kevin M. Zyvoloski, Raleigh, N.C.

[73] Assignee: International Business Machines Corp., Armonk, N.Y.

[21] Appl. No.: 398,820

[22] Filed: Aug. 25, 1989

[51] Int. Cl.⁵ .............................................. H04L 9/32
[52] U.S. Cl. ......................................... 380/4; 380/25; 380/50; 340/825.31; 340/825.34
[58] Field of Search ................... 364/200, 900; 380/4, 380/23, 24, 25, 49, 50; 340/825.34, 825.31

[56] References Cited

U.S. PATENT DOCUMENTS

| | | | |
|---|---|---|---|
| 3,931,504 | 8/1973 | Jacoby | 364/200 |
| 3,996,449 | 12/1976 | Attanasio | 235/431 |
| 4,446,519 | 5/1984 | Thomas | 364/200 |
| 4,491,914 | 1/1985 | Sujaku | 364/200 |
| 4,525,599 | 6/1985 | Curran | 380/4 |
| 4,562,306 | 12/1985 | Chou | 380/4 |
| 4,577,289 | 3/1986 | Comerford | 364/900 |
| 4,593,353 | 6/1986 | Pickholtz | 364/200 |
| 4,685,055 | 8/1987 | Thomas | 364/200 |
| 4,685,056 | 8/1987 | Barnsdale | 364/200 |
| 4,688,169 | 8/1987 | Joshi | 364/200 |
| 4,747,139 | 5/1988 | Taaffe | 380/44 |
| 4,748,561 | 5/1988 | Brown | 364/300 |
| 4,757,533 | 7/1988 | Allen et al. | 380/25 |
| 4,757,534 | 7/1988 | Matyas | 380/25 |
| 4,785,361 | 11/1988 | Brotby | 360/60 |
| 4,796,220 | 1/1989 | Wolfe | 364/900 |
| 4,817,140 | 3/1989 | Chandra | 380/4 |

Primary Examiner—Stephen C. Buczinski
Assistant Examiner—Bernarr Earl Gregory
Attorney, Agent, or Firm—Winfield J. Brown, Jr.

[57] ABSTRACT

An apparatus and method for protecting BIOS stored on a direct access storage device into a personnal computer system. The personal computer system comprises a system processor, a system planar, a random access main memory, a read only memory, a protection means and at least one direct access storage device. The read only memory includes a first portion of BIOS and data representing the type of system processor and system planar I/O configuration. The first portion of BIOS initializes the system and the direct access storage device, and resets the protection means in order to read in a master boot record into the random access memory from a protectable partition on the direct access storage device.

32 Claims, 13 Drawing Sheets

APPARATUS AND METHOD FOR PREVENTING UNAUTHORIZED ACCESS TO BIOS IN A PERSONAL COMPUTER SYSTEM

CROSS REFERENCE TO RELATED PATENT APPLICATIONS

The present patent application is one of a group of copending applications which concern the same overall personal computer system but which individually claim different inventive concepts embodied in such personal computer system. These related patent applications were filed on the same date, namely Aug. 25, 1989, are specifically incorporated by reference herein, and are more particularly described as follows:

(1) Application Ser. No. 07/399,631, entitled "An Apparatus and Method for Loading BIOS from a Diskette in a Personal Computer System", the inventors being Bealkowski et al;

(2) Application Ser. No. 07/398,865, entitled "Initial BIOS Load for a Personal Computer System", the inventors being Bealkowski et al; and (3) Application Ser. No. 07/398,860, entitled "An Apparatus and Method for Decreasing the Memory Requirements for BIOS in a Personal Computer System", the inventors being Bealkowski et al.

FIELD OF THE INVENTION

This invention relates to personal computer systems and in particular to a method and device for protecting BIOS stored on a mass storage device in a personal computer system.

BACKGROUND DISCUSSION

Personal computer systems in general and IBM personal computers in particular have attained widespread use for providing computer power to many segments of today's modern society. Personal computer systems can usually be defined as a desk top, floor standing, or portable microcomputer that consists of a system unit having a single system processor, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's PERSONAL COMPUTER AT and IBM's PERSONAL SYSTEM/2 Models 25, 30, 50, 60, 70 and 80.

These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICROCHANNEL bus architecture exemplified by IBM's PERSONAL SYSTEM/2 Models 50 through 80.

Beginning with the earliest personal computer system of the family I models, such as the IBM Personal Computer, it was recognized that software compatibility would be of utmost importance. In order to achieve this goal, an insulation layer of system resident code, also known as "microcode", was established between the hardware and software This code provided an operational interface between a user's application program/operating system and the device to relieve the user of the concern about the characteristics of hardware devices. Eventually, the code developed into a BASIC input/output system (BIOS), for allowing new devices to be added to the system, while insulating the application program from the peculiarities of the hardware. The importance of BIOS was immediately evident because it freed a device driver from depending on specific device hardware characteristics while providing the device driver with an intermediate interface to the device. Since BIOS was an integral part of the system and controlled the movement of data in and out of the system processor, it was resident on the system planar and was shipped to the user in a read only memory (ROM). For example, BIOS in the original IBM Personal Computer occupied 8K of ROM resident on the planar board.

As new models of the personal computer family were introduced, BIOS had to be updated and expanded to include new hardware and I/O devices. As could be expected, BIOS started to increase in memory size. For example, with the introduction of the IBM PERSONAL COMPUTER AT, BIOS grew to require 32K bytes of ROM.

Today, with the development of new technology, personal computer systems of the Family II models are growing even more sophisticated and are being made available to consumers more frequently. Since the technology is rapidly changing and new I/O devices are being added to the personal computer systems, modification to the BIOS has become a significant problem in the development cycle of the personal computer system.

For instance, with the introduction of the IBM Personal System/2 with MICROCHANNEL architecture, a significantly new BIOS, known as advanced BIOS, or ABIOS, was developed. However, to maintain software compatibility, BIOS from the Family I models had to be included in the Family II models. The Family I BIOS became known as Compatibility BIOS or CBIOS. However, as previously explained with respect to the IBM PERSONAL COMPUTER AT, only 32K bytes of ROM were resident on the planar board. Fortunately, the system could be expanded to 96K bytes of ROM. Unfortunately, because of system constraints, this turned out to be the maximum capacity available for BIOS. Luckily, even with the addition of ABIOS, ABIOS and CBIOS could still squeeze into 96K of ROM. However, only a small percentage of the 96K ROM area remained available for expansion. With the addition of future I/O devices, CBIOS and ABIOS will eventually run out of ROM space. Thus, new I/O technology will not be able to be easily integrated within CBIOS and ABIOS.

Due to these problems, plus the desire to make modifications in Family II BIOS as late as possible in the development cycle, it became necessary to off load portions of BIOS from the ROM. This was accomplished by storing portions of BIOS on a mass storage device such as a fixed disk. Since a disk provides writing as well as reading capabilities, it became feasible to modify the actual BIOS code on the disk. The disk, while providing a fast and efficient way to store BIOS code, nevertheless greatly increased the probability of the BIOS code being corrupted. Since BIOS is an integral part of the operating system, a corrupt BIOS could lead to devastating results and in many cases to complete failure and non-operation of the system. Thus, it became quite apparent that a means for preventing unauthorized modification of the BIOS code on the fixed disk was highly desireable.

SUMMARY OF THE INVENTION

The present invention has been developed for the purpose of solving the above mentioned problems. Accordingly, the invention has as one of its objects a means for preventing unauthorized changes to BIOS stored on a direct access storage device in a personal computer system.

Another objective of the present invention is to provide protection for disk loaded BIOS which is inexpensive to implement and substantially transparent to the end user so that it does not detract from the commercial acceptance of the computer system.

Broadly considered, a personal computer system according to the present invention comprises a system processor, a random access memory, a read only memory, and at least one direct access storage device. A direct access storage device controller coupled between the system processor and direct access storage device includes a means for protecting a region of the storage device. The protected region of the storage device includes a master boot record and a BIOS image. In response to a reset signal, the protection means permits access to the protected region to allow the master boot record to be loaded into random access memory. In operation, the master boot record further loads the BIOS image into random access memory. BIOS, now in random access memory, is executed and generates a second signal which activates the protection means to prevent access to the region on the disk containing the master boot record and the BIOS image. BIOS then boots up the operating system to begin operation of the system.

In particular, the read only memory includes a first portion of BIOS. The first portion of BIOS initializes the system processor, the direct access storage device and resets the protection means to read the master boot record from the protected region or partition on the direct access storage device into the random access memory. The master boot record includes a data segment and an executable code segment. The data segment includes data representing system hardware and a system configuration which is supported by the master boot record. The first BIOS portion confirms the master boot record is compatible with the system hardware by verifying the data from the data segment of the master boot record agrees with data included within the first BIOS portion representing the system processor, system planar, and planar I/O configuration.

If the master boot record is compatible with the system hardware, the first BIOS portion vectors the system processor to execute the executable code segment of the master boot record. The executable code segment confirms that the system configuration has not changed and loads in the remaining BIOS portion from the direct access storage device into random access memory. The executable code segment then verifies the authenticity of the remaining BIOS portion, vectors the system processor to begin executing the BIOS now in random access memory. BIOS, executing in random access memory, generates the second signal for protecting the disk partition having the remaining BIOS and then boots up the operating system to begin operation of the personal computer system. The partition holding the remaining BIOS is protected to prevent access to the BIOS code on disk in order to protect the integrity of the BIOS code.

BRIEF DESCRIPTION OF THE DRAWINGS

The foreground aspects and other features of the present invention are explained in the following written description, taken in connection with the accompanying drawings, wherein.

DESCRIPTION OF A PREFERRED EMBODIMENT

The following detailed description is of the best presently contemplated mode for carrying out the invention. This description is not to be taken in a limiting sense but is made merely for the purpose of illustrating the general principles of the invention since the scope of the invention is best defined by the appending claims.

Figure 1:
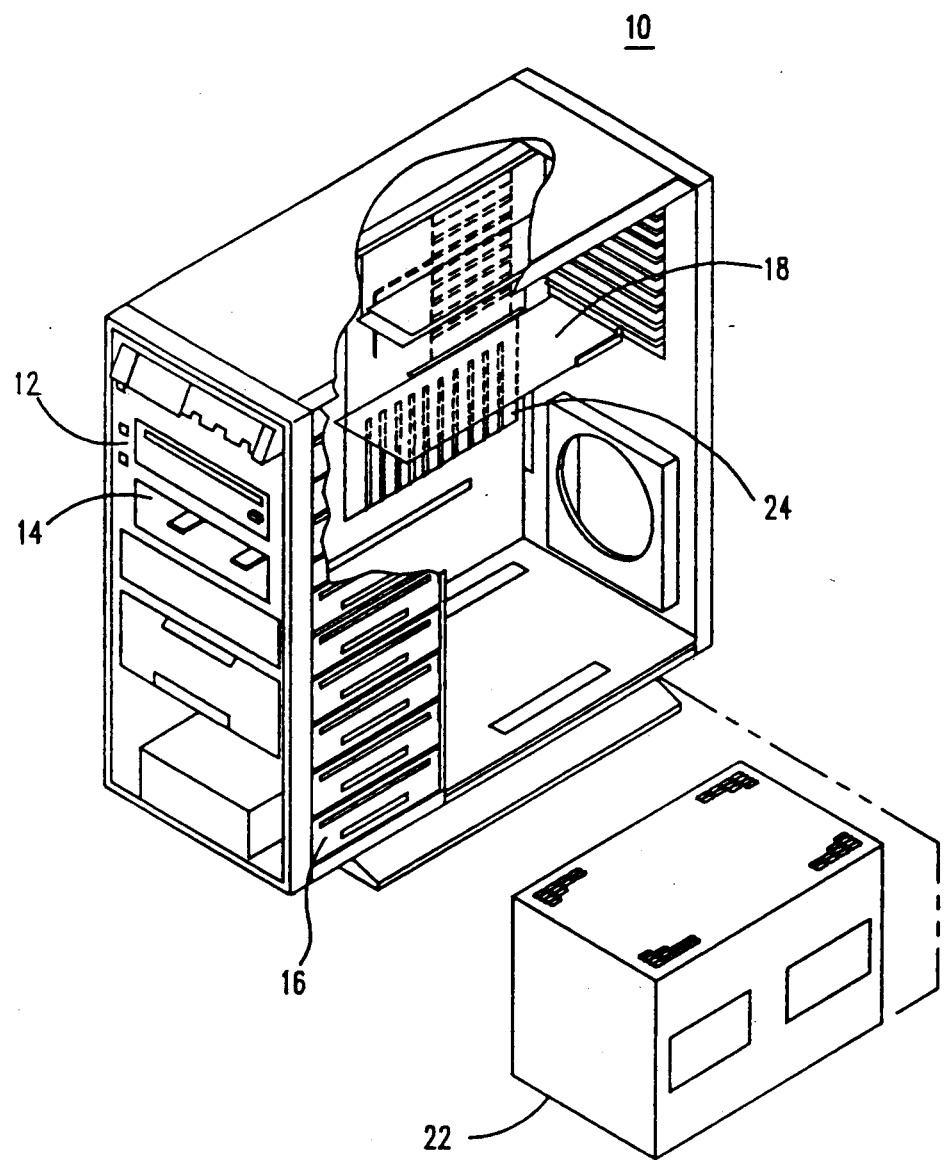
FIG. 1 illustrates a cut away view of a personal computer system showing a system planar board connected to a plurality of direct access storage devices.

Referring now to the drawings, and in particular to FIG. 1, there is shown a cutaway version of a personal computer system 10, having a plurality of DASD (Direct Access Storage Devices) 12-16 connected to a system or planar board 24 through a plurality of I/O slots 18. A power supply 22 provides electrical power to the system 10 in a manner well known. The planar board 24 includes a system processor which operates under the control of computer instructions to input, process, and output information.

In use, the personal computer system 10 is designed primarily to give independent computing power to a small group of users or a single user and is inexpensively priced for purchase by individuals or small businesses. In operation, the system processor operates under an operating system, such as IBM's OS/2 Operating System or PC-DOS. This type of operating system includes a BIOS interface between the DASD 12-16 and the Operating System. A portion of BIOS divided into modules by function is stored in ROM on the planar 24 and hereinafter will be referred to as ROM-BIOS. BIOS provides an interface between the hardware and the operating system software to enable a programmer or user to program their machines without an indepth operating knowledge of a particular device. For example, a BIOS diskette module permits a programmer to program the diskette drive without an indepth knowledge of the diskette drive hardware. Thus, a number of diskette drives designed and manufactured by different companies can be used in the system. This not only lowers the cost of the system 10, but permits a user to choose from a number of diskette drives.

Figure 2:
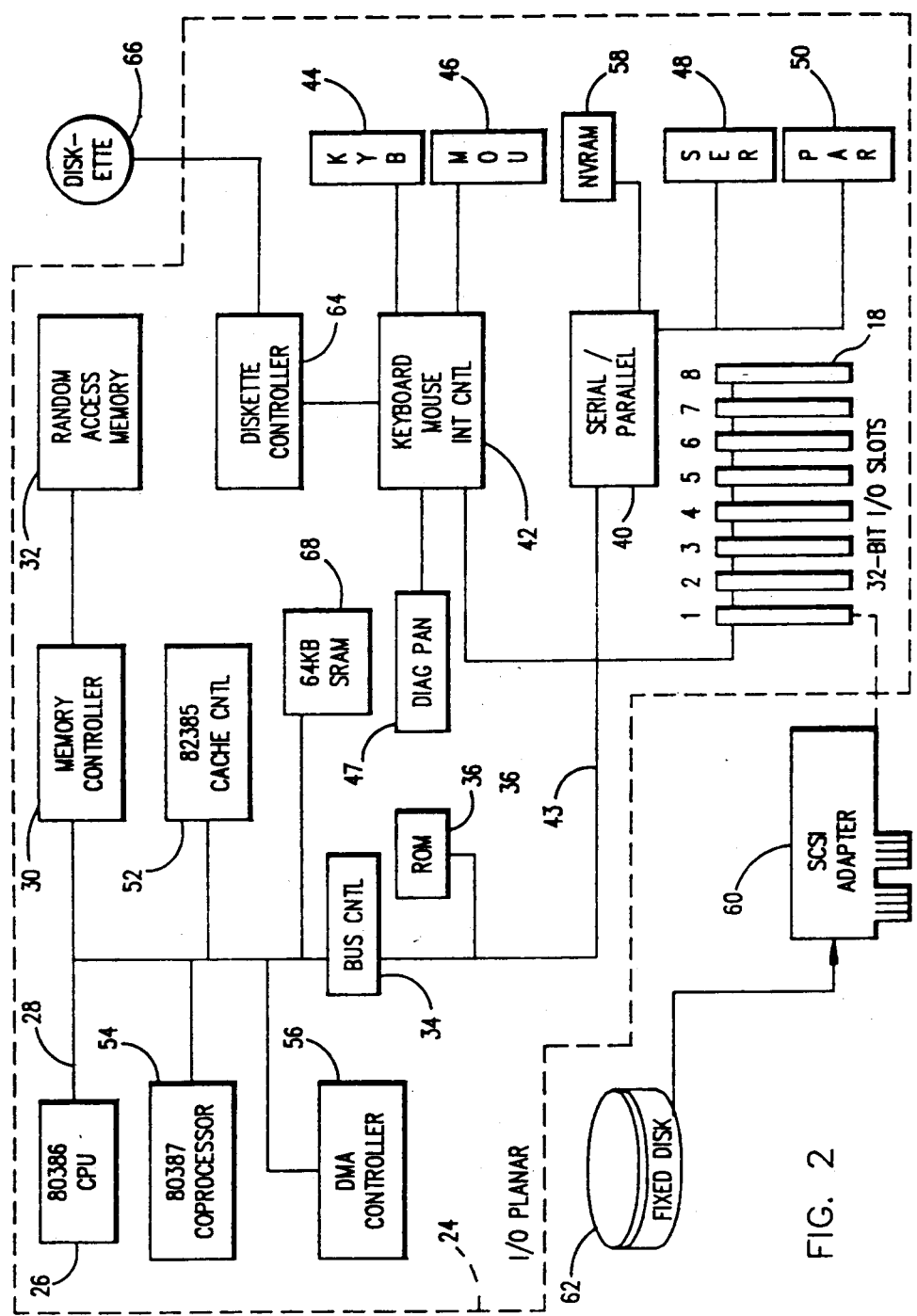
FIG. 2 shows a system block diagram for the personal computer system of FIG. 1.

Prior to relating the above structure to the present invention, a summary of the operation in general of the personal computer system 10 may merit review. Referring to FIG. 2, there is shown a block diagram of the personal computer system 10 FIG. 2 illustrates components of the planar 24 and the connection of the planar 24 to the I/O slots 18 and other hardware of the personal computer system. Located on the planar 24 is the system processor 26 comprised of a microprocessor which is connected by a local bus 28 to a memory controller 30 which is further connected to a random access memory (RAM) 32. While any appropriate microprocessor can be used, one suitable microprocessor is the 80386 which is sold by Intel.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board For example, the system processor could be an Intel 80286 or 80486 microprocessor.

Accessible by the processor is a planar identification number (planar ID). The planar ID is unique to the planar and identifies the type of planar being used. For example, the planar ID can be hardwired to be read through an I/O port of the system processor 26 or by using switches. Additionally, another I/O port of the system processor 26 can be used to generate a reset signal using planar logic circuitry to the disk controller. For instance, the reset signal can be initiated by software addressing the I/O port and activating planar logic to generate the reset signal.

The local bus 28 is further connected through a bus controller 34 to a read only memory (ROM) 36 on the planar 24.

An additional nonvolatile memory (NVRAM) 58 is connected to the microprocessor 26 through a serial/parallel port interface 40 which is further connected to bus controller 34. The nonvolatile memory can be CMOS with battery backup to retain information whenever power is removed from the system. Since the ROM is normally resident on the planar, model and submodel values stored in ROM are used to identify the system processor and the system planar I/O configuration respectively. Thus these values will physically identify the processor and planar I/O configuration. The NVRAM is used to store system configuration data. That is, the NVRAM will contain values which describe the present configuration of the system. For example, NVRAM contains information describing the capacity of a fixed disk or diskette, the type of display, the amount of memory, time, date, etc. Additionally, the model and submodel values stored in ROM are copied to NVRAM whenever a special configuration program, such as SET Configuration, is executed. The purpose of the SET Configuration program is to store values characterizing the configuration of the system in NVRAM. Thus for a system that is configured properly, the model and submodel values in NVRAM will be equal respectively to the model and submodel values stored in ROM. If these values are not equal, this indicates that the configuration of the system has been modified. Reference is made to FIG. 6D, where this feature in combination with loading BIOS is explained in greater detail.

Continuing, our discussion with reference to FIG. 2, the bus controller 34 is further coupled to I/O slots 18, the serial/parallel interface 40 and peripheral controller 42 by an I/O planar bus 43. The peripheral controller 42 is further connected to a keyboard 44, mouse 46, diagnostic panel 47, and diskette controller 64. Beside the NVRAM 58, the serial/parallel interface 40 is further connected to a serial port 48 and parallel port 50 to input/output information to a printer, hard copy device, etc. As is well known in the art, the local bus 28 can also be connected to a cache controller 52, a cache memory 68, a co-processor 54, and a DMA controller 56.

The system processor 26 controls its internal operation as well as interfacing with other elements of the personal computer system 10. For example, system processor 26 is shown connected to a small computer system interface (SCSI) I/O card 60 which is further connected to a DASD, such as a fixed disk drive 62. It is to be understood that other than a SCSI disk drive can be used as a fixed disk in accordance with the present invention. In addition to the fixed disk 62, the system processor 26 can be interfaced to the diskette controller 64 which controls a diskette drive 66. With respect to terminology, it is also to be understood that the term "hardfile" describes fixed disk drive 62 while the term "floppy" also describes diskette drive 66.

Previous to the present invention, ROM 36 could include all of the BIOS code which interfaced the operating system to the hardware peripherals. According to one aspect of the present invention, however, ROM 36 is adapted to store only a portion of BIOS. This portion, when executed by the system processor 26, inputs from either the fixed disk 62 or diskette 66 a second or remaining portion of BIOS, hereinafter also referred to as a BIOS image. This BIOS image supersedes the first BIOS portion and being an integral part of the system is resident in main memory such as RAM 32. The first portion of BIOS (ROM-BIOS) as stored in ROM 36 will be explained generally with respect to FIGS. 3-4 and in detail with respect to FIGS. 6A-D. The second portion of BIOS (BIOS image) will be explained with respect to FIG. 5, and the loading of the BIOS image with respect to FIG. 7. Another benefit from loading a BIOS image from a DASD is the ability to load BIOS directly into the system processor's RAM 32. Since accessing RAM is much faster than accessing ROM, a significant improvement in the processing speed of the computer system is achieved.

The explanation will now proceed to the operation of the BIOS in ROM 36 and to the operation of loading the BIOS image from either the fixed disk or diskette. In general, a first program such as ROM-BIOS prechecks the system and loads a BIOS master boot record into RAM. The master boot record includes a data segment having validation information and, being a loading means, a code segment having executable code. The executable code uses the data information to validate hardware compatibility and system configuration. After testing for hardware compatibility and proper system configuration, the executable code loads the BIOS image into RAM producing a main memory resident program. The BIOS image succeeds ROM-BIOS and loads the operating system to begin operation of the machine. For purposes of clarity, the executable code segment of the master boot record will be referred to as MBR code while the data segment will be referred to as MBR data.

Figure 3:
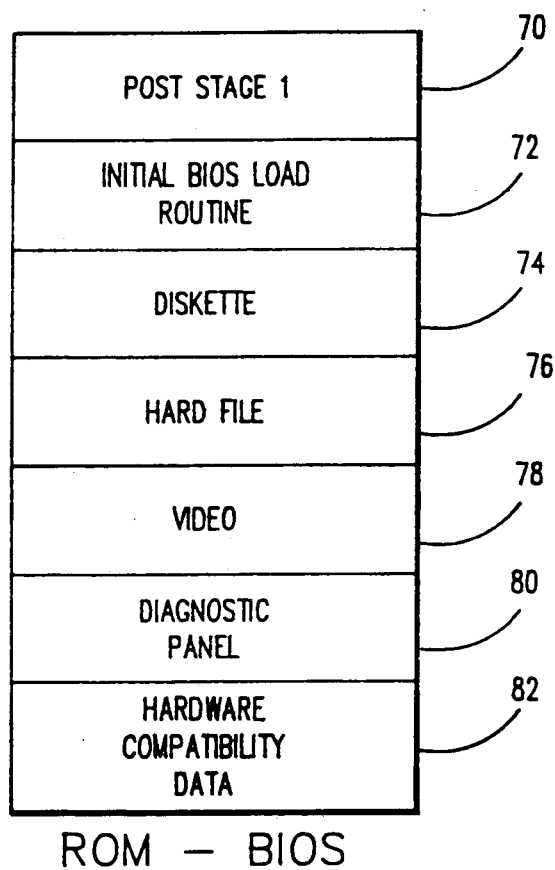
FIG. 3 is a memory map for the ROM BIOS included on the planar board.

Referring to FIG. 3 there is a memory map showing the different code modules which comprise ROM-BIOS. ROM-BIOS includes a power on self test (POST) stage I module 70, an Initial BIOS Load (IBL) Routine module 72, a Diskette module 74, a hardfile module 76, a video module 78, a diagnostic-panel module 80, and hardware compatibility data 82. Briefly, POST Stage I 70 performs system pre-initialization and tests. The IBL routine 72 determines whether the BIOS image is to be loaded from disk or diskette, checks compatibility and loads the master boot record. Diskette module 74 provides input/output functions for a diskette drive. Hardfile module 76 controls I/O to a fixed disk or the like. Video module 78 controls output functions to a video I/O controller which is further connected to a video display. Diagnostic panel module 80 provides control to a diagnostic display device for the system. The hardware compatibility data 82 includes such values as a system model and submodel values which are described later with respect to FIG. 5.

Figure 4:
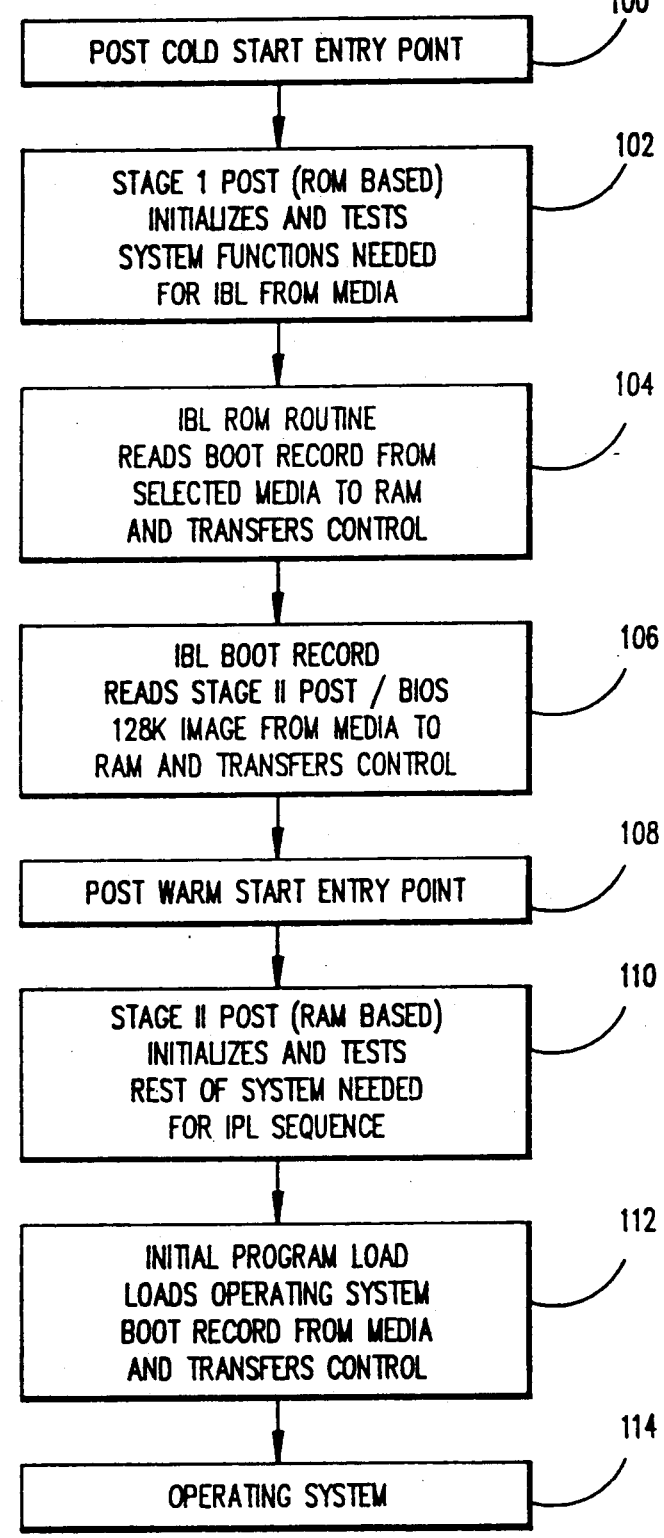
FIG. 4 is a flowchart describing the overall process for loading a BIOS image from a direct access storage device.

Referring now to FIG. 4, there is shown a process overview for loading a BIOS image into the system from either the fixed disk or the diskette. When the system is powered up, the system processor is vectored to the entry point of POST Stage I, step 100. POST Stage I initializes the system and tests only those system functions needed to load BIOS image from the selected DASD, step 102. In particular, POST Stage I initializes the processor/planar functions, diagnostic panel, memory subsystem, interrupt controllers, timers, DMA subsystem, fixed disk BIOS routine (Hardfile module 76), and diskette BIOS routine (Diskette module 74), if necessary.

After POST Stage I pre-initializes the system, POST Stage I vectors the system processor to the Initial BIOS Load (IBL) routine included in the Initial BIOS Load module 72. The IBL routine first, determines whether the BIOS image is stored on fixed disk or can be loaded from diskette; and second, loads the master boot record from the selected media (either disk or diskette) into RAM, step 104. The master boot record includes the MBR data and the MBR code. The MBR data is used for verification purposes and the MBR code is executed to load in the BIOS image. A detailed description of the operation of the IBL routine is presented with respect to FIGS. 6A-D.

With continuing reference to FIG. 4, after the IBL routine loads the master boot record into RAM, the system processor is vectored to the starting address of the MBR code to begin execution, step 106. The MBR code performs a series of validity tests to determine the authenticity of the BIOS image and to verify the configuration of the system. For a better understanding of the operation of the MBR code, attention is directed to FIG. 7 of the drawings wherein the MBR code is described in greater detail.

Figure 8:
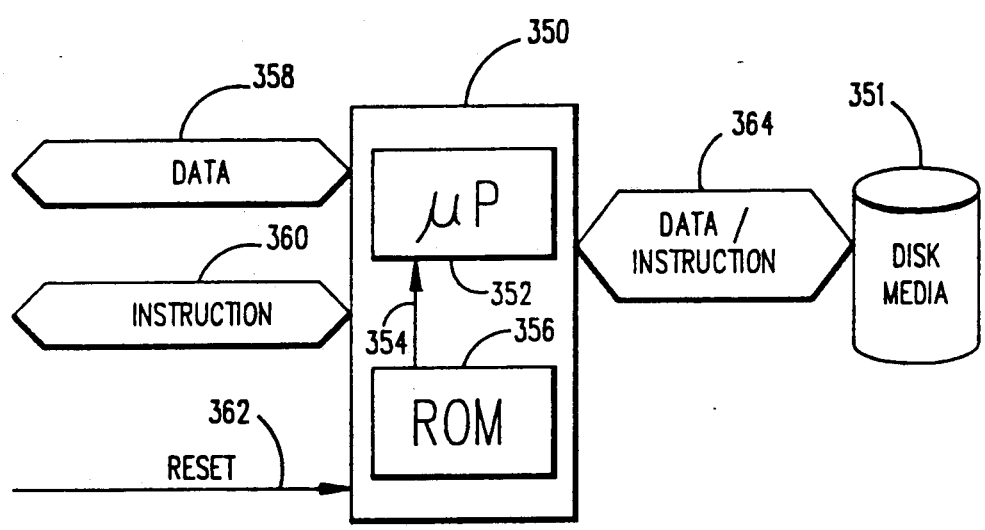
FIG. 8 is a block diagram for the controller of the direct access storage device.
Figure 9:
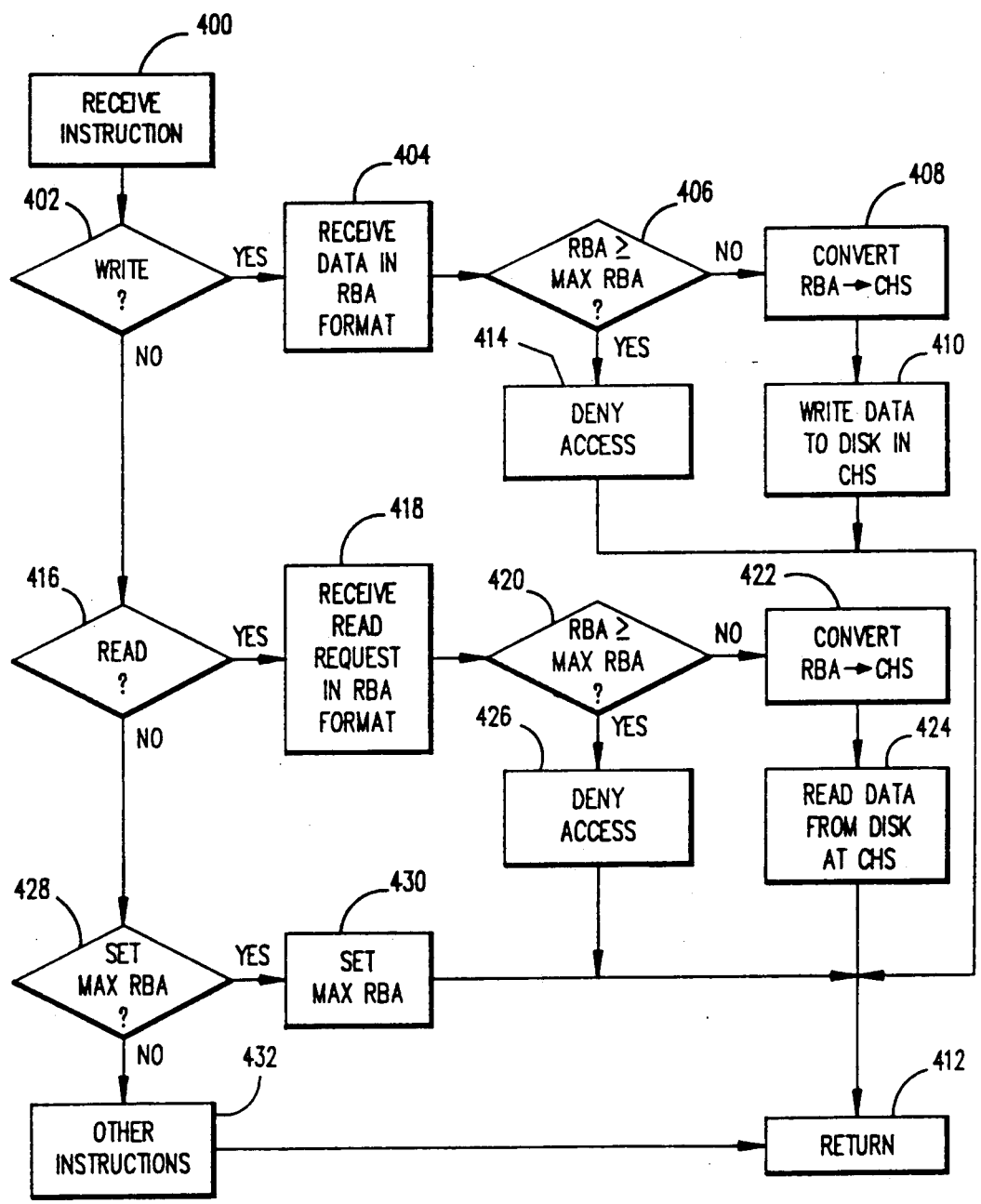
FIG. 9 is a flow diagram showing the operation of a disk controller to protect the IBL media stored on a disk drive.
Figure 10:
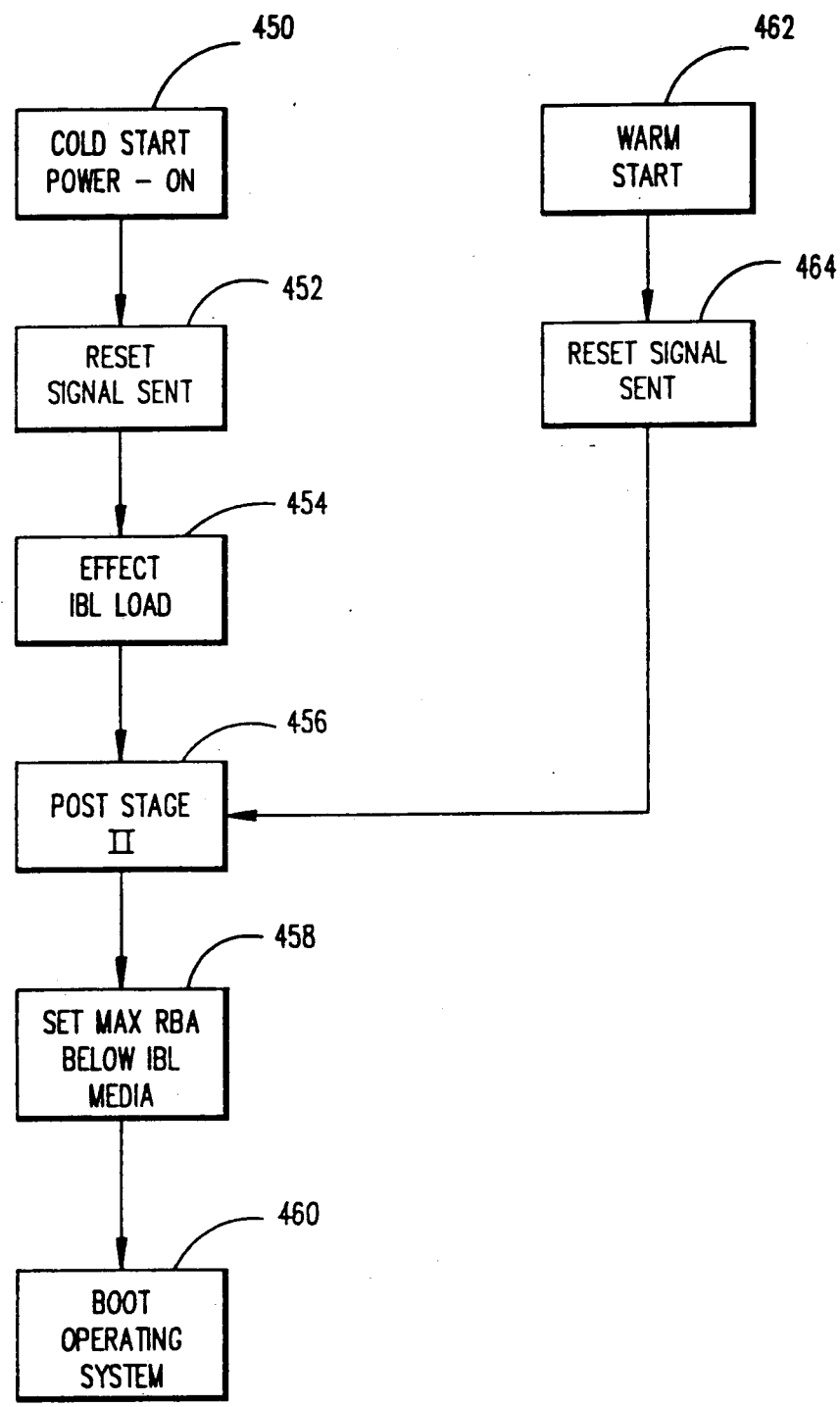
FIG. 10 is a flowchart showing a method for protecting the BIOS image.

On the basis of these validity tests, the MBR code loads the BIOS image into RAM and transfers control to the newly loaded BIOS image in main memory, step 108. In particular, the BIOS image is loaded into the address space previously occupied by ROM-BIOS. That is if ROM-BIOS is addressed from E0000H through FFFFFH, then the BIOS image is loaded into this RAM address space thus superseding ROM-BIOS Control is then transferred to POST Stage II which is included in the newly loaded BIOS image thus abandoning ROM-BIOS. POST Stage II, now in RAM, initializes and tests the remaining system in order to load the operating system boot, steps 110-114. Before Stage II POST transfers control to the operating system, Stage II POST sets a protection means for preventing access to the disk partition holding the BIOS image. Reference is made to FIGS. 8-10 for a detailed discussion of this protection process. It is noted that during a warm start, the processor is vectored to step 108, bypassing steps 100-106.

Figure 5:
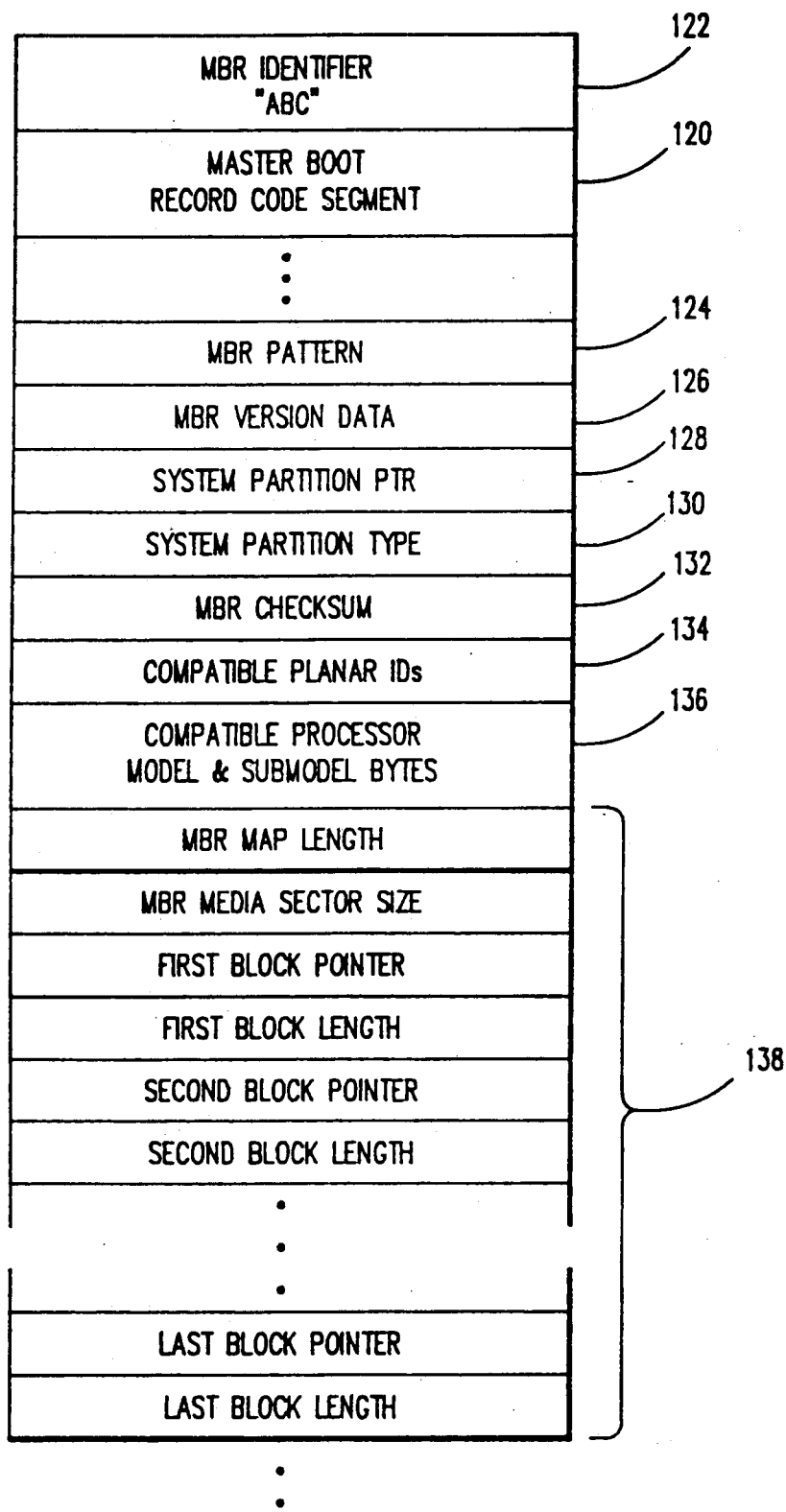
FIG. 5 illustrates the record format for the master boot record.

For clarity, it is appropriate at this point to illustrate a representation for the format of the master boot record. Referring to FIG. 5, there is shown the master boot record. The boot record includes the executable code segment 120 and data segments 122-138. The MBR code 120 includes DASD dependent code responsible for verifying the identity of the ROM-BIOS, checking that the IBL boot record is compatible with the system, verifying the system configuration, and loading the BIOS image from the selected DASD (disk or diskette). The data segments 122-138 include information used to define the media, identify and verify the master boot record, locate the BIOS image, and load the BIOS image.

The master boot record is identified by a boot record signature 122. The boot record signature 122 can be a unique bit pattern, such as a character string "ABC", in the first three bytes of the record. The integrity of the master boot record is tested by a checksum value 132 which is compared to a computed checksum value when the boot record is loaded. The data segments further include at least one compatible planar ID value 134, compatible model and submodel values 136. The master boot record's planar ID value defines which planar that the master boot record is valid for. Similarly, the master boot record's model and submodel values define the processor and planar I/O configuration respectively that the master boot record is valid for. It is noted that the boot record's signature and checksum identify a valid master boot record, while the boot record's planar ID, boot record's model and boot record's submodel comparisons are used to identify a boot record compatible with the system and to determine if the system configuration is valid. Another value, boot record pattern 124 is used to determine the validity of the ROM-BIOS. The boot record pattern 124 is compared to a corresponding pattern value stored in ROM. If the values match this indicates that a valid ROM-BIOS has initiated the load of a BIOS image from the selected media.

The following description further describes in greater detail each of the values in the master boot record and their functions:

MBR Identifier (122): The first three bytes of the IBL boot record can consist of characters, such as "ABC". This signature is used to identify a boot record.

MBR Code Seqment (120): This code verifies the compatibility of the boot record with the planar and processor by comparing corresponding planar id and model/submodel values. If these values match, it will load the BIOS image from the chosen media to system RAM. If the system image (BIOS image loaded into memory) checksum is valid and no media load errors occur, the MBR code will transfer control to the POST Stage II routine of the system image.

MBR Pattern (124): The first field of the IBL boot record data segment contains a pattern, such as a character string "ROM-BIOS 1989". This string is used to validate the ROM-BIOS by comparing the Boot Pattern value to the corresponding value stored in ROM (ROM-Pattern).

MBR Version Date (126): The master boot record includes a version date for use by an update utility.

System Partition Pointer (128): The data segment contains a media pointer to the beginning of the media system partition area for use by Stage II POST. On an IBL diskette, the pointer is in track-head-sector format; on disk the pointer is in Relative Block Address (RBA) format.

System Partition Type (130): The system partition type indicates the structure of the media system partition. There are three types of system partition structures—full, minimal and not present. The full system partition contains the setup utility and diagnostics in addition to the BIOS image and master boot record. The minimal system partition contains just the BIOS image and master boot record. It may occur where a system does not have access to a hardfile having an IBL image, in this circumstance the system partition type indicates not present. In this instance, IBL will occur from the diskette. These three system partition types allow flexibility in how much space the system partition takes up on the media.

Checksum value (132): The checksum value of the data segment is initialized to generate a valid checksum for the record length value (1.5 k bytes) of the master boot record code.

MBR Planar ID Value (134): The data segment includes a value, such as a string of words defining compatible planar IDs. Each word is made up of a 16 bit planar ID and the string is terminated by word value of zero. If a system's planar ID matches the planar ID value in the master boot record, such as one of the words in the string, the IBL media image is compatible with the system planar. If the system's planar ID does not match any word in the string, the IBL media image is not compatible with the system planar.

MBR model and submodel values (136): The data segment includes values, such as a string of words defining compatible processors. Each word is made up of a model and submodel value and the string is terminated by a word value of zero. If a system's model and submodel value (stored in ROM) match one of the words in the string, the IBL media image is compatible with the system processor. If the ROM model and ROM submodel values do not match any word in the string, the IBL media image is not compatible with the system processor.

MBR Map length (138): The IBL map length is initialized to the number of media image blocks In other words, if the BIOS image is broken into four blocks, the map length will be four indicating four block pointer/length fields. Usually this length is set to one, since the media image is one contiguous 128 k block.

MBR Media Sector Size (138): This word value is initialized to the media sector size in bytes per sector.

Media image block pointer (138): The media image block pointer locates a system image block on the media. Normally, there is only one pointer since the media image is stored as one contiguous block. On an IBL diskette, the pointers are in track-head-sector format; on disk the pointers are relative block address format.

Media image block length (138): The media image block length indicates the size (in sectors) of the block located at the corresponding image block pointer. In the case of a 128 k contiguous media image, which includes space for BASIC, this field is set to 256, indicating that the BIOS image block takes up 256 sectors (512 bytes/sector) starting at the media image block pointer location.

Referring now to FIGS. 6A-D, there is shown a detailed flow chart of the operation of the IBL routine. Under normal circumstances, the IBL routine loads the master boot record from the system fixed disk into RAM at a specific address and then vectors the system processor to begin executing the code segment of the master boot record. The IBL routine also contains provisions for a diskette default mode in which the master boot record can be loaded from diskette. However, the IBL routine does not allow the diskette default mode to be performed if the system contains the IBL media on the system fixed disk and a valid password is present in NVRAM. The user has the option of setting the password in NVRAM. The purpose of preventing the diskette default mode from being effected is to prevent loading an unauthorized BIOS image from diskette. In other words, the diskette default mode is used only when a system fixed disk is not operational and the user has indicated (by not setting the password) the desire to be able to load from the diskette. If the IBL routine is not able to load the master boot record from either media, an error message is generated and the system is halted.

Figure 6A:
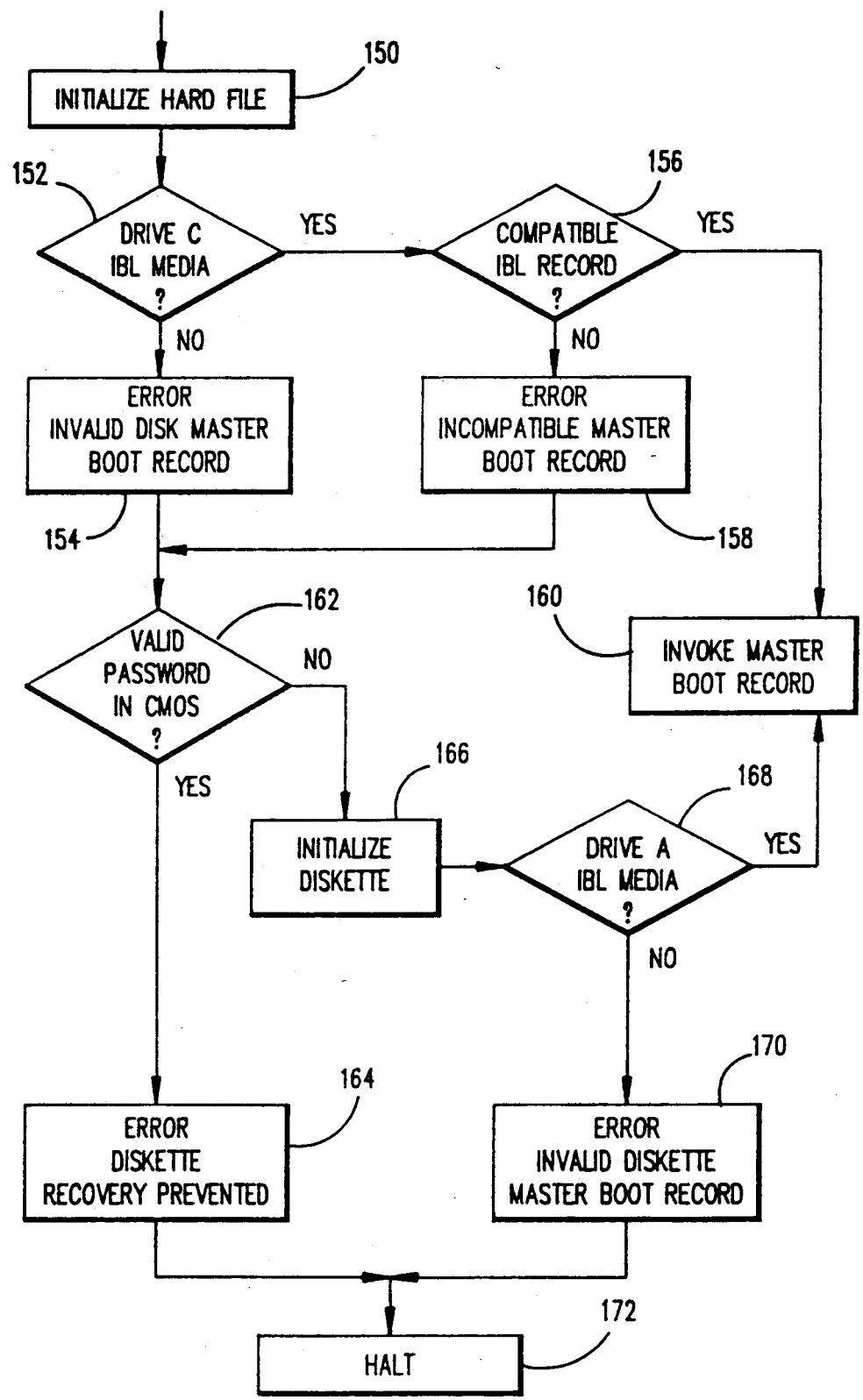
FIG. 6A is a flowchart describing the operation of the IBL routine.
Figure 6B:
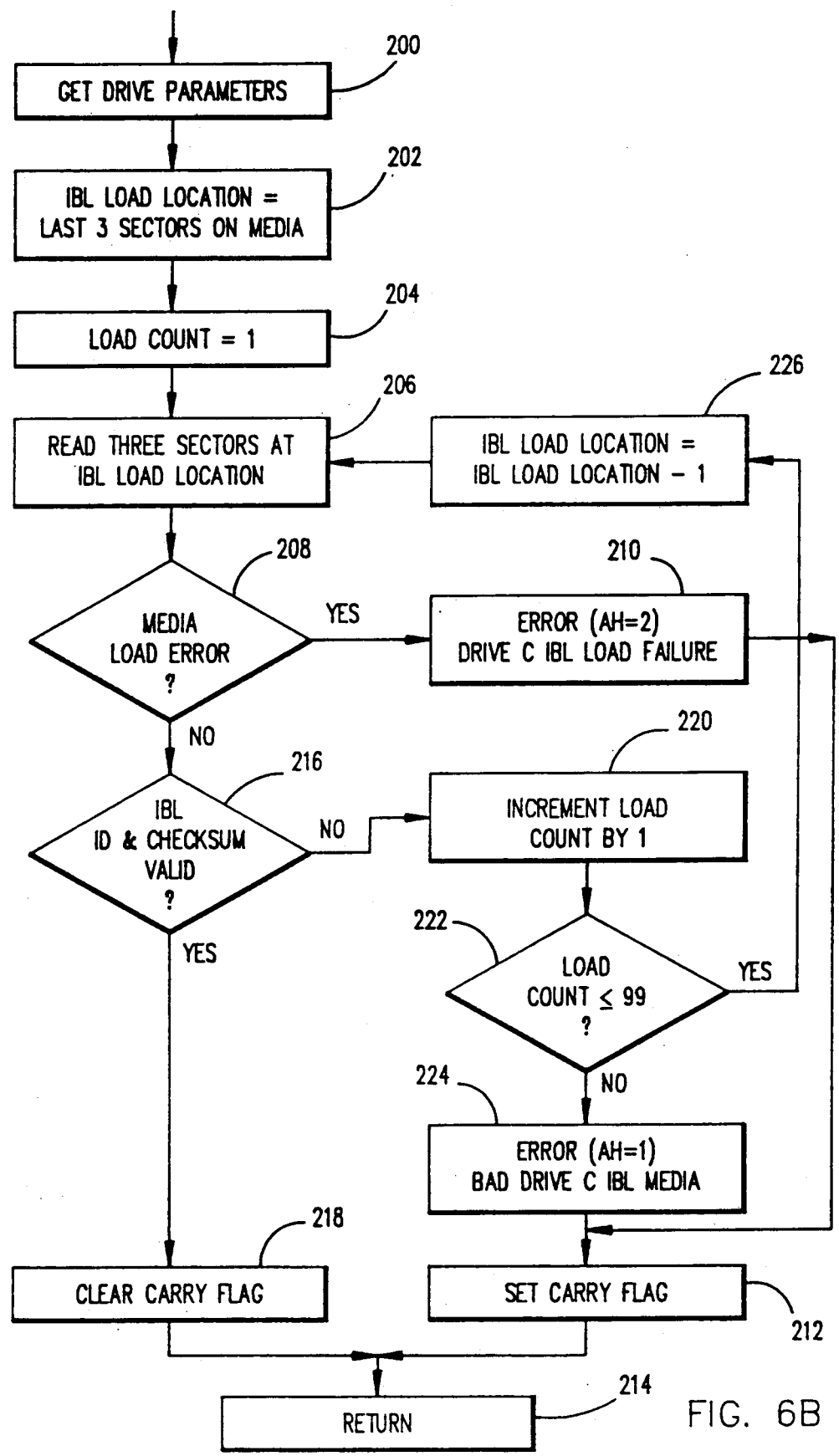
FIG. 6B is a flowchart showing the steps for loading a BIOS image from a fixed disk.

Referring now to FIG. 6A, under normal circumstances the system will contain a system fixed disk which the IBL routine initializes, step 150. Assume for purposes of illustration that the fixed disk is configured for Drive C of the personal computer system. Similarly, assume Drive A is designated as the diskette drive. The IBL routine then examines Drive C to determine whether it contains IBL media, step 152. Attention is directed to FIG. 6B which describes in detail this process. The IBL routine starts reading from the fixed disk at the last three sectors and continues reading, decrementing the media pointer, for 99 sectors or until a valid master boot record is found. If a master boot record is found, it is checked for system planar and processor compatibility, step 156. If it is not planar or processor compatible, then an error is reported, step 158. Referring back to step 152, if no master boot record is found on the last 99 sectors of the fixed disk (primary hardfile), an error is reported, step 154.

Referring back to step 156, if a master boot record is found, a series of validity checks are performed to determine if the master boot record is compatible with the computer system. Additionally, the configuration of the system is checked. Attention is directed to FIG. 6D which discloses this process in greater detail If the boot record is compatible with the planar ID, model and submodel, and if furthermore the system configuration has not changed the master boot record is loaded and the code segment of the master boot record is executed, step 160.

Referring back to steps 154 and 158, if an error occurs in loading the master boot record from the fixed disk or if a fixed disk is not available, the IBL routine determines if a valid password is included in NVRAM, step 162. This password determines whether the BIOS image can be loaded from diskette. Note that the password will exist only upon being installed by the user running a set features utility. If a password is installed in NVRAM, the BIOS image is prevented from being loaded from diskette, step 164. This permits the user to ensure the integrity of the operation of the system by causing the system to be loaded only with the BIOS image on the fixed disk. The password can take the form of a string of characters stored in NVRAM.

Figure 6C:
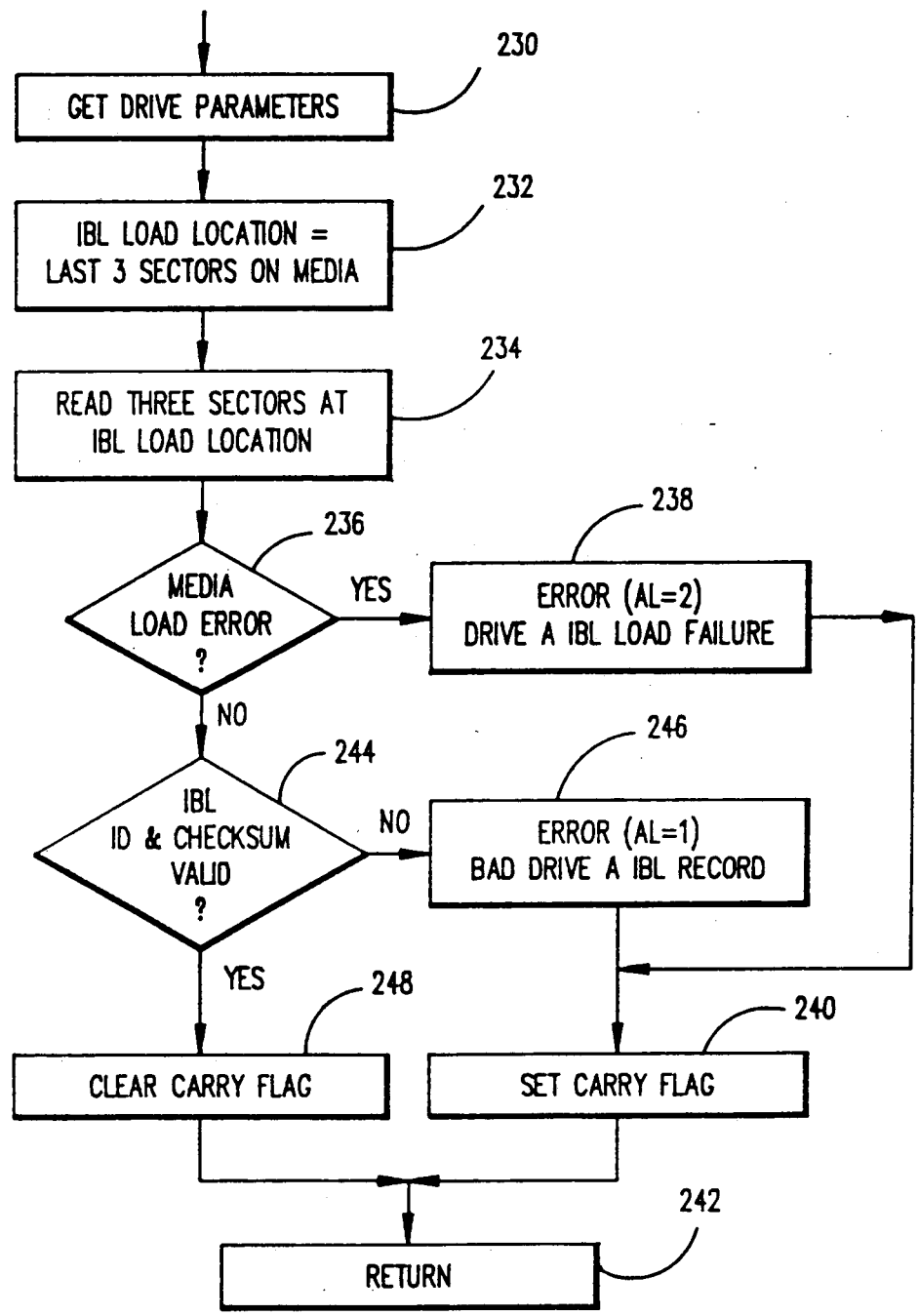
FIG. 6C is a flowchart showing the steps for loading the BIOS image from a diskette.
Figure 6D:
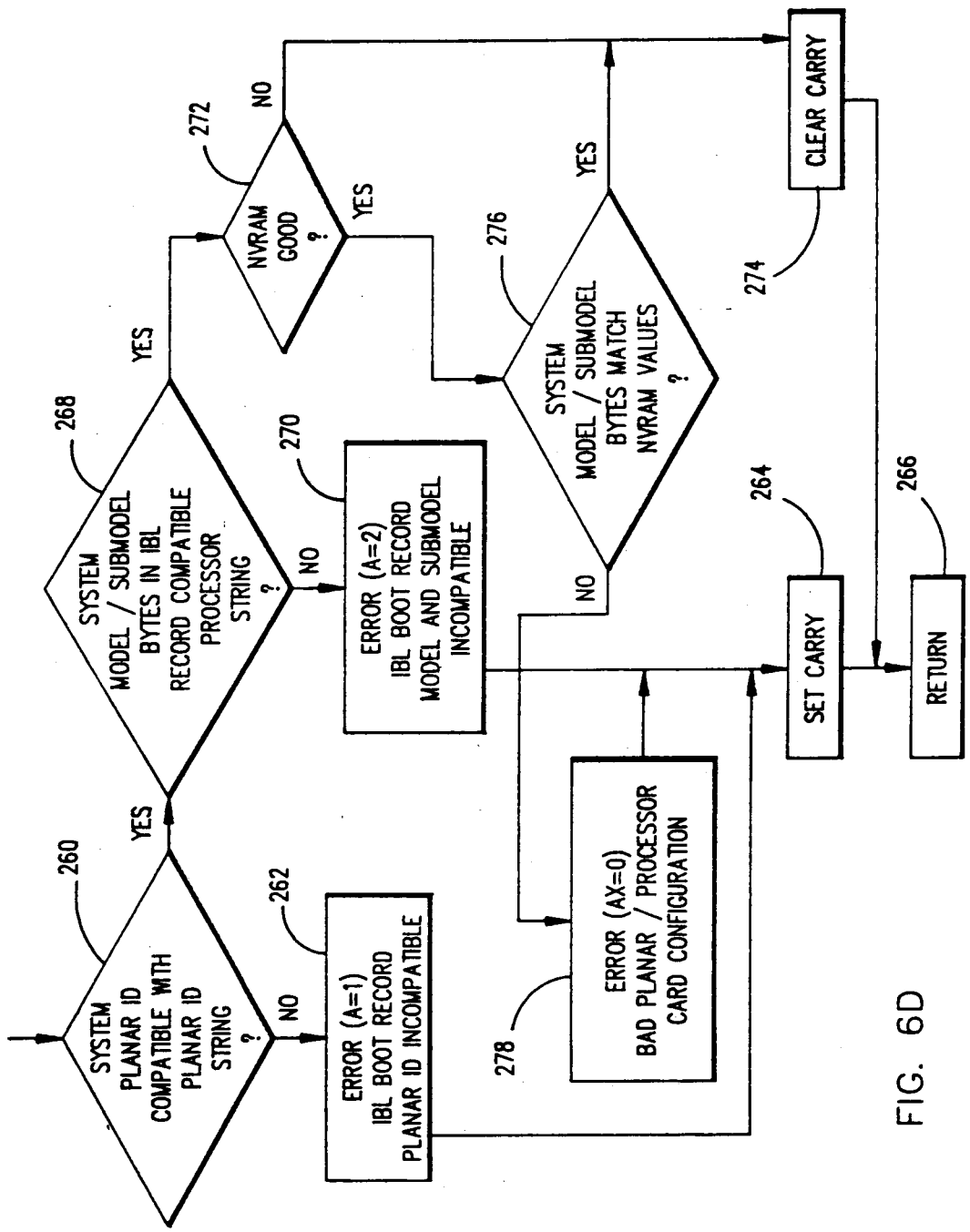
FIG. 6D is a flowchart showing greater detail in checking the compatibility between the master boot record and the planar/processor.

Referring back to step 162, if a valid password in NVRAM is not present, thus allowing BIOS image to be loaded from diskette, the IBL routine initializes the diskette subsystem, step 166. The IBL routine then determines if Drive A includes the IBL media on a diskette, step 168. If Drive A does not include IBL media, an error is generated to notify the user that an invalid diskette has been inserted in the drive, step 170. The system then halts, step 172. Attention is directed to FIG. 6C for a more detailed discussion of step 168.

Referring back to step 168, after Drive A is checked for IBL media, the master boot record is loaded into RAM and the code segment included in the master boot record is executed, step 160. It is important to note that for diskette the IBL routine does not include the validity checks that are used with the fixed disk system. The reason for the absence of the validity checks is for loading a non-compatible IBL image from diskette. For example, if a new processor is added to the system, a new BIOS image will be included on a diskette. Since a new processor will cause validity errors when loading from fixed disk, the IBL routine provides the ability to bypass these tests by loading the BIOS image from diskette.

To recapitulate, the master boot record is checked for compatibility with the system through matching the system planar ID and processor model/submodel values to the boot record values. For disk, this check is done first in the IBL routine 72 and then done again in the IBL boot record. The first check (in the IBL routine) is done to make sure the boot record is compatible with the system; the second check (in the boot record) is done to ensure a compatible ROM passed control to the boot record. Notice that the check done in the disk boot record will never fail for a compatible ROM since the IBL routine will have already checked the compatibility. In contrast, the first compatibility check is not done for diskette. The planar/processor compatibility is checked only during diskette boot record execution. This method allows future modifications in loading a new BIOS image from a reference diskette.

In view of the description of the IBL routine of FIG. 6A, the explanation will now proceed to a comprehensive and full understanding of the validity tests discussed above. Referring to FIG. 6B, there is shown a detailed flowchart of step 152 of FIG. 6A, to determine if a valid master boot record is on drive C. The process begins by obtaining the drive parameters to enable the IBL routine to access drive C, step 200. An IBL load location is set to the last three sectors from the disk (the last three sectors normally contain the master boot record), step 202. A load count indicating the number of attempts to read a master boot record from disk is set to 1, step 204. Three sectors are read from disk at the IBL load location, step 206. Any disk drive errors are detected and if a disk drive read error occurs it is reported, steps 208-210. The process then returns with an error indication, steps 212-214.

Referring back to step 208, if no drive error occurs, the disk record is scanned for the master boot record signature, step 216. The boot record signature, such as the characters "ABC", are compared to the first three bytes of the disk record. If the disk record does have a valid boot record signature (characters "ABC") and the checksum computed from the disk record loaded into memory equals the boot record checksum, the disk record is indicated as being a valid boot record with no errors, step 218. The process then returns, step 214.

Referring back to step 216, if the boot record signature or checksum is invalid, the load count is incremented by 1, step 220. The load count is then compared to a predetermined constant such as 99, step 222. If 99 attempts to read a boot record have resulted in failure, an error is indicated and the process returns, steps 224, 212 and 214. If less than 99 attempts to read a boot record have occurred, the IBL load location is decremented by one and three new sectors are read from the new load location, steps 226 and 206. Thus if a valid IBL boot record cannot be loaded from the last 99 sectors (equivalent to 33 copies) then an error condition is set and control returns to the IBL routine.

Referring now to FIG. 6C, there is shown a detailed flow diagram for loading the master boot record from diskette on drive A. First, the diskette drive parameters to access drive A are retrieved, step 230. The IBL load location is set to the last 3 sectors on diskette (cylinder, head and sector format), step 232. The last 3 sectors are read, step 234. If a diskette drive error is detected an error is indicated, steps 236-238. An error condition is set and control is returned to the IBL routine, steps 240-242.

Referring back to step 236, if no drive error is detected, the diskette record is checked for boot record signature and the checksum is calculated, step 244. If the boot record signature is missing or checksum is invalid, an error is indicated and control returned to the IBL routine, steps 244, 246, 240 and 242. If a valid boot record signature and valid checksum are detected an indication is set and control is returned to the IBL routine, steps 248 and 242. It is noted that in a diskette load, the IBL routine does not search through the media as in the fixed disk load. Therefore, in a diskette load, the IBL media must be stored in a specific location of the diskette.

Finally, FIG. 6D shows how the IBL routines tests for system planar and processor compatibility and for a proper system configuration. The master boot record is checked for compatibility with the system planar by comparing the boot record planar ID value to the system planar ID read by the system processor, step 260. If the system planar ID does not match the boot record planar ID value, this indicates this master boot record is not compatible with this planar. An error is indicated and control return to the IBL routine, steps 262, 264, and 266.

If the master boot record is compatible with the planar, the master boot record is checked for compatibility with the processor, step 268. The boot record model value and submodel value are compared to the model value and submodel value stored in ROM respectively. A mismatch indicates a new processor has probably been inserted and this boot record is not compatible with the new processor. An error is indicated and control returned to the IBL routine, steps 270, 264 and 266.

If the master boot record is compatible with the planar and processor, the process checks to determine if NVRAM is reliable, step 272. If NVRAM is unreliable, an error is indicated and control returned to the IBL routine, steps 274 and 266. If NVRAM is reliable, the system configuration is checked, step 276. A change in system configuration is indicated if the model and submodel values stored in NVRAM do not match the model and submodel values stored in ROM. Note that this last comparison will only indicate a configuration error. If a configuration error is indicated, an error is generated for the user. This error notifies the user that the configuration of the system has changed since the last time SET Configuration was run. The user is notified of the changed configuration and control passed back to the IBL routine steps 278, 264, and 266. This error is not fatal itself, but notifies the user that SET Configuration (configuration program) must be executed. Referring back to step 276, if the system model/submodel values match, an indication of comparability is set and the routine returns, steps 276, 274 and 266. Thus, the compatibility between the master boot record and the system are tested along with determining if the system configuration has been modified.

Figure 7:
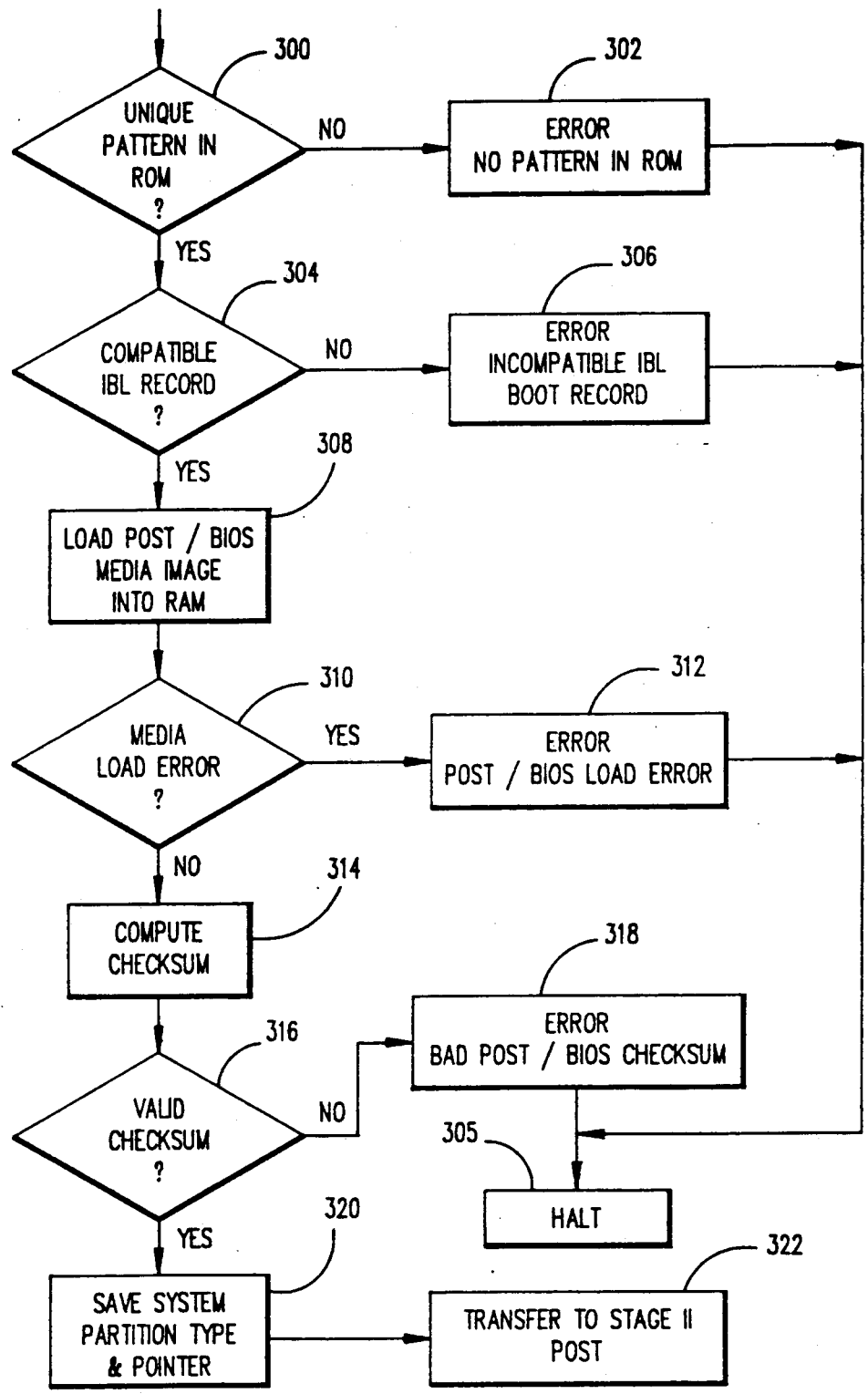
FIG. 7 is a detailed flowchart showing the operation of the executable code segment of the master boot record.

After the IBL routine loads the master boot record into RAM, it transfers control to the MBR code starting address. Referring to FIG. 7, the executable code segment of the master boot record first verifies the boot record pattern to the ROM pattern, step 300. If the pattern in the master boot record does not match the pattern in ROM, an error is generated and the system halts, steps 302 and 305. The check for equality between ROM and boot record patterns ensures that the master boot record loaded from either the disk or diskette is compatible with the ROM on the planar board. Referring back to step 300, if the pattern in ROM matches the pattern in the boot record, the MBR code compares the system planar ID value, model and submodel value against the corresponding master boot record values, step 304. This process was discussed in greater detail with respect to FIG. 6D. If the values don't match, the master boot record is not compatible with the system planar and processor, or the system configuration has changed, and an error is generated, step 306. The system will halt when the IBL record is incompatible with planar, model or submodel values, step 305.

Referring back to step 304, if the system planar ID value, model and submodel values match the corresponding master boot record values, the MBR code loads the BIOS image from the selected media into the system RAM, step 308. If a media load error occurs in reading the data, step 310, an error is generated and the system halts, steps 312 and 305. Referring back to step 310, if no media load error occurs, a checksum is calculated for the BIOS image in memory, step 314. If the checksum is invalid an error is generated and the system halts, steps 318 and 305. Referring back to step 316, if the checksum is valid, the system partition pointers are saved, step 320, and the system processor is vectored to POST Stage II to begin loading the system, step 322.

Referring to FIG. 8, there is shown a block diagram of an intelligent disk controller 350 for controlling movement of data between the disk drive 351 and the system processor. It is understood that disk controller 350 can be incorporated into the adapter card 60 while disk drive 351 can be included onto drive 62 of FIG. 2. A suitable disk controller 350 is a SCSI Adapter having a part number of 33F8740, which is manufactured by International Business Machines Corporation. It is understood that the disk controller 350 includes a microprocessor 352 operating under its own internal clock, for controlling its internal operations as well as its interfacing with the other elements of the disk subsystem and the system processor. The microprocessor 352 is coupled by a instruction bus 354 to a read only memory (ROM) 356 which stores instructions which the disk controller 350 executes to process and control the movement of data between the disk drive and the system processor. It is also understood that disk controller 350 can include random access memory coupled to microprocessor 352 for the storage or retrieval of data. The movement of data between disk controller 350 and the system processor is effected by data bus 358 and instruction bus 360. A reset signal on line 362 resets or initializes the disk controller logic upon power-on sequence or during a system reset. The reset signal is generated by the planar board logic, and can take the form of a channel reset signal as provided by IBM's MICROCHANNEL architecture as described in "IBM PERSONAL SYSTEM/2 Seminar Proceedings", Volume 5, Number 3, May 1987 as published by the International Business Machines Corporation Entry Systems Division. Furthermore, the reset signal can be effectively initiated by BIOS outputting a particular bit configuration to an I/O port of the system processor in which the planar logic is connected.

As is well known, the microprocessor 352 provides all the interfacing and timing signals to effect the efficient transfer of data between the disk drive and the system processor. For clarity, only those signals important for the understanding of the invention are presented. It is understood that other signals and lines, such as data bus 364, are used but are not presented here since they are not important for the understanding of the present invention. It is further understood that only those programs or routines as stored in ROM 356 important for the understanding of the present invention are explained with respect to FIG. 9.

Referring now to FIG. 9, there is shown a flowchart diagramming the read, write, and protect functions of the disk controller which are effected by the operation of routines stored in ROM 356. In operation, a disk instruction is initiated by the system processor and transferred to the disk controller 350. The disk controller receives and interprets the instruction to perform the designated operation, step 400. The disk controller first determines if this is a write operation in which data from the system processor are stored on the disk drive hardware, step 402. If the instruction is a write instruction, data are received from the system processor in relative block address (RBA) format.

Prior to continuing the discussion above, a brief explanation of the relative block address format applied to a mass storage device, such as a disk, may merit review. RBA is a scheme in which data in mass storage are addressed in predetermined sized blocks by sequential numbers, i.e. individual definable contiguous blocks of data. For example, assuming a block size of 1024 bytes, the system processor can approximately address 10,000 blocks for a 10 megabyte disk. That is, the system processor can address the disk media in terms of N blocks where N ranges from 0 to 9,999. It has been discovered, that the use of RBA provides a very fast and efficient method for addressing mass storage in the type of operating systems used for personal computer systems of the present invention.

For convenience sake, the following assumptions will be introduced: first, the disk can support a total of N blocks; second, the system processor transfers a K block, where K is greater than or equal to 0 and is less than or equal to (N−1); third, the disk controller can set a maximum addressable block M which permits access to data blocks where K is less than M and denies access to data blocks where K is greater than or equal to M. Note, by setting M less than N a protectable region on the disk is generated from M to N−1 blocks. This feature permits the IBL media to be protected as will be discussed below.

Continuing our discussion with reference to FIG. 9, the data are received from the disk in RBA format, step 404. The disk controller then determines if the received block K is less than the maximum block value M, where M is less than N, step 406. If K is less than M then the disk controller converts the RBA format into the particular format for the mass storage device, such as cylinder-head-sector (CHS) format for a fixed disk, step 408. For instance, the disk controller by using a look up table could convert RBA addresses to unique cylinder-head-sector location. Another method is the use of a conversion formula to convert RBA to CHS. For example, for a disk having one head, 64 cylinders, and 96 sectors: Head=0, cylinders=quotient of RBA/(96), and sectors=remainder of RBA/(96). After converting the RBA format to a CHS format the data are written to disk at the converted CHS location, step 410. The disk controller then waits for another instruction from the system processor, step 412.

Referring back to step 406, if the received RBA is greater than the maximum set RBA value, access is denied, step 414. That is if K is greater than or equal to M, the K block is not written to the disk. Please note, if the IBL media is stored in the blocks from M to N−1, then the IBL media will be protected from writing.

Referring back to step 402, if the instruction from the system processor is not a write instruction, it is tested for being a read instruction, step 416. If the instruction is a read instruction, the system processor sends the RBA format for the data requested, step 418. The disk controller then determines if the desired RBA (K) is less than the maximum set RBA (M). If the desired RBA (K) is less than the maximum set RBA (M), then the disk controller converts the RBA to the appropriate CHS format and reads the data from the disk, steps 422 and 424. The data are then transferred to the system processor, step 412.

Referring back to step 420, if the received RBA (K) is greater than or equal to the maximum set RBA (M), access is denied, step 426. If the IBL media is stored between M blocks and (N−1) blocks, access is denied to this area. Please note, that in this circumstance, the IBL media is also protected from copying.

Referring back to step 416, if the instruction is not a write or read instruction, it is tested for a set maximum RBA instruction, step 428. This instruction allows the disk controller to create a protectable area or partition on the disk drive hardware. This instruction allows the disk controller to set M between 0 and N blocks, step 430. It is important to note that when the disk controller is reset (through the reset signal) that M is set so that the maximum number of blocks are available. That is, when the disk controller is reset, M=N. Essentially, protection for the protectable area is eliminated upon resetting the disk controller, allowing access to the area. However, once the set maximum RBA instruction is executed only a reset or another set maximum RBA instruction will allow access to the protectable area. Conceptually, the setting of the maximum RBA can be thought of as setting a fence which protects access to the area above the fence while allowing access to the area below the fence. The disk controller then returns to wait for another instruction, step 412.

Referring back to step 428, if the instruction is not a read, write, or set maximum RBA instruction, it is tested for another disk controller instruction and executed, step 432. These instructions will use the set maximum RBA value but are not important for the understanding of the present invention and are not presented here for brevity purposes. The disk controller then returns to wait for another instruction, step 412.

The explanation will now proceed to the operation of the loading in and protecting the IBL media in view of the proceeding discussion. In general, from either a cold start (power-on) or a warm start (alt-ctrl-del), the disk controller having the IBL media is reset. This causes the maximum RBA (M) to be set to N, i.e. the fence is removed allowing access to the IBL media. This is required to allow the system to load the IBL media to begin operation. Once the IBL media is loaded and executed the fence is erected (set maximum RBA below IBL media) to prevent access to the IBL media stored on disk.

Referring now to FIG. 10, there is shown a block flow diagram effecting the protection of the IBL media. From a power-on condition the system is initialized and BIOS initiates activity in planar board logic to send a reset condition to the disk controller, steps 450 and 452. The reset signal drops the fence and allows the system processor to access the IBL media previously stored on the disk in the area from M blocks to N blocks. The system loads the IBL media as previously described with reference to FIG. 4–7, step 454. During the IBL loading sequence Post Stage II is executed, step 456. One of the tasks of POST Stage II is to execute the set maximum RBA instruction with the maximum RBA set to the first block of the IBL media which is designated as M, step 458. M is dependent upon partition type (none, partial or full) as previously explained. This in effect sets the fence denying access to the IBL media while allowing access to other regions of the disk. The operating system is then booted up in a normal fashion, step 460.

If the system is started from a warm start condition, such as alt-ctrl-del, the planar logic is commanded to reset the disk controller by POST Stage II, steps 462 and 464. This causes the fence to be dropped. In this circumstance, since the IBL media is already present in RAM, the IBL media is not loaded again. However, since the protection for the IBL media is eliminated POST Stage II must be executed to reset the fence, steps 456 and 458. The fence is erected protecting the IBL media and the system is then rebooted in a normal manner, step 460.

Thus, there has been shown a method and apparatus for protecting access to the IBL media stored on a mass storage device, such as a disk drive. The IBL media is protected by addressing mass storage in blocks and setting a maximum block the system can access during normal operation. The IBL media is stored consecutively in those blocks between the maximum block accessible and the total number of blocks supported by the disk drive. A reset signal sent to the disk controller eliminates the maximum block accessible to permit the system to address the IBL media. The reset signal is generated during a power-on condition or a warm-start condition to permit access to the IBL media to boot up the system.

While the invention has been illustrated in connection with a preferred embodiment, it should be understood that many variations will occur to those of ordinary skill in the art, and that the scope of the invention is defined only by the claims appended hereto and equivalent.

We claim:

1. An apparatus for protecting BIOS in a personal computer system, the personal computer system having a system processor for executing an operating system, a read only memory, a random access memory, and at least one direct access storage device, said apparatus comprising:

a direct access storage device controller having a protection means for protecting a region of the at least one direct access storage device, said protection means allowing access to the protected region in response to a reset signal;

a master boot record included in the protected region of the at least one direct access storage device, said master boot record including an executable code segment having means for loading information from the at least one direct access storage device;

a first portion of BIOS being included in the read only memory, said first portion of BIOS initializing the system processor and initiating generation of the reset signal to the direct access storage device controller to permit the system processor to access said master boot record in order to load said master boot record into the random access memory;

a remaining portion of BIOS being included in the protected region of the at least one direct access storage device, said remaining portion of BIOS being loaded into the random access memory by the executable code segment in response to said first portion of BIOS transferring control to the executable code segment, the executable code segment transferring control to said remaining portion of BIOS to boot the operating system, said remaining portion of BIOS activating said protection means to prevent access to the protected region of the at least one direct access storage device during normal operations of the operating system.

2. The apparatus of claim 1, wherein the at least one direct access storage device comprises a fixed disk.

3. The apparatus of claim 2, wherein said system processor transfers data records to a disk controller in blocks being in a format which numbers the blocks sequentially, and further wherein said master boot record and said remaining portion of BIOS are effectively stored in a higher ordered numbered of blocks.

4. The apparatus of claim 3, wherein said protection means comprises setting a maximum block addressable, said maximum block addressable being a lowest order numbered block of the master boot record and the remaining portion of BIOS, said protection means preventing access to numbered blocks equal to or greater than the maximum block addressable while permitting access to numbered blocks less than the maximum block addressable.

5. The apparatus of claim 1, wherein said first portion of BIOS initiates the generation of the reset signal in response to the personal computer system being powered on.

6. The apparatus of claim 1, wherein said first portion of BIOS initiates the generation of the reset signal in response to a reset condition being applied to the personal computer system.

7. The apparatus of claim 1, wherein the master boot record further includes hardware configuration data, the hardware configuration data representing a hardware configuration of the personal computer system which is compatible with said master boot record, and further wherein the read only memory includes system processor identification data representing a hardware configuration of the system processor, wherein before said remaining portion of BIOS is loaded into the random access memory, said first portion of BIOS compares the hardware configuration data from the master boot record with the system processor identification data from the read only memory to verify the master boot record is compatible with the system processor.

8. The apparatus of claim 7, wherein the data segment of the master boot record includes a value representing a system planar which is compatible with the master boot record and further wherein the system planar further includes a means for uniquely identifying the system planar in order to verify that the master boot record is compatible with the system planar.

9. The apparatus of claim 7, wherein the hardware configuration data from the master boot record includes a model value and a submodel value, wherein the model value identifies a system processor which is compatible with said master boot record and the submodel value represent an I/O configuration of a system planer which is compatible with the master boot record, and further wherein said read only memory includes a corresponding model value identifying the system processor and a corresponding submodel value representing the I/O configuration of the system planar, wherein said model value and said submodel value of the master boot record are compared to the corresponding model and the submodel value of the read only memory respectively, in order to verify that the master boot record is compatible with the system processor and the I/O configuration of the system planar.

10. The apparatus of claim 1, wherein the personal computer system further includes a nonvolatile random access memory being electrically coupled to the system processor, said nonvolatile random access memory including data representing a system configuration, said data being updated when the system configuration is changed, wherein said first portion of BIOS compares said data in the nonvolatile random access memory to corresponding data in the read only memory to determine if the configuration of the system has changed.

11. An apparatus for protecting a system resident program in a personal computer system, the personal computer system having a system processor, a read only memory, a main memory, and at least one direct access storage device capable of storing a plurality of data records, said apparatus comprising:

a first program being included in the read only memory, said first program initializing the system processor, said first program further initiating the generation of a reset signal to the at least one direct access storage device to permit access to the data records;

a loading means for loading data records from the at least one direct access storage device into the main memory, said loading means being stored in a protectable partition of the at least one direct access storage device, said loading means being read from the at least one direct access storage device into the main memory by said first program, wherein said first program activates said loading means;

a main memory resident program image being stored in the protectable partition of the at least on direct access storage device, said main memory resident program image being read from the at least one direct access storage device into the main memory by said loading means to produce a main memory resident program;

means for protecting the protectable partition of the at least one direct access storage device, said means for protecting being activated by said main memory resident program to prevent unauthorized access to said loading means and said main memory resident program image.

12. The apparatus of claim 11, wherein said loading means further includes a validation means for confirming the personal computer system is compatible with the main memory resident program.

13. The apparatus of claim 12, wherein said validation means includes data representing a type of system processor and a configuration of a system planar coupled to the system processor.

14. The apparatus of claim 12, wherein said loading means comprises a master boot record having an executable code segment for effecting the loading of the main memory resident program, wherein said first program transfers control to said executable code segment to effect the loading of said main memory resident program image into the main memory.

15. The apparatus of claim 11, wherein said first program includes a power on self test routine, said power on self test routine initializing and testing operating functions of the personal computer system necessary to load the main memory resident program.

16. The apparatus of claim 15, wherein said power on self test routine initializes the system processor, the main memory, and the at least one direct access storage device.

17. The apparatus of claim 11, wherein the at least one direct access storage device comprises a fixed disk drive wherein said loading means loads data records from said fixed disk drive into the main memory.

18. The apparatus of claim 17, wherein said fixed disk drive includes a disk controller and further wherein said system processor transfers data records to said disk controller in blocks being in a format which numbers the blocks sequentially, and further wherein said main memory resident program image is effectively stored in a higher ordered number of blocks.

19. The apparatus of claim 18, wherein said protection means comprises setting a maximum block addressable, said maximum block addressable being a lowest order numbered block of the main memory resident program image, said protection means preventing access to numbered blocks greater than or equal to the maximum block addressable while permitting access to numbered blocks less than the maximum block addressable.

20. The apparatus of claim 11, wherein said first program initiates generation of the reset signal in response to power being applied to the system.

21. The apparatus of claim 11, wherein said first program initiates generation of the reset signal in response to a reset condition being applied to the system.

22. A device for preventing an unauthorized access of BIOS stored in a mass storage device in a personal computer system having a system processor, the mass storage device capable of storing a plurality of data blocks defined between a first and second data block extreme, BIOS being accessible by the system processor in the form of individual definable contiguous blocks of data, BIOS extending from a third data block extreme to a fourth data block extreme, the third and fourth extremes being bounded by the first and second extremes, said device comprising:
 (a) controller device coupled between said system processor and said mass storage device for transforming a communication request from the system processor to physical characteristics of the mass storage device, the input/output requests being in the form of individual definable contiguous blocks of data;
 (b) first logic means for initiating the generation of a reset signal;
 (c) second logic means for generating a second signal for preventing access to the BIOS; and
 (d) protection means responsive to said reset signal for permitting access to said BIOS, said protection means being responsive to said second signal for setting a boundary at the third data block extreme to prevent access to the BIOS during normal execution of authorized programs by the system processor.

23. The device of claim 22, wherein the mass storage device comprises a fixed disk having input/output requests in the form of a cylinder, head and sector format, and further wherein said controller converts from data block format to cylinder, head and sector format.

24. The device of claim 22, wherein said controller device includes an SCSI adapter card responsive to said system processor.

25. The device of claim 22, wherein the first logic means initiates generation of the reset signal in response to a power on condition for the system processor.

26. The device of claim 22, wherein the first logic means initiates generation of the reset signal in response to an input from a keyboard connected to the system.

27. A method for protecting BIOS in a personal computer system, the system including a system processor, a read only memory, a random access memory, and direct storage access device, said method comprising the steps of:
 (a) storing a first portion of BIOS in the read only memory, the first portion of BIOS including means for initializing the system;
 (b) storing a master boot record and a remaining portion of BIOS in a protectable partition on the direct access storage device, the remaining portion of BIOS being resident in the random access memory during normal operations of the personal computer system;
 (c) initializing the system and initiating the generation of a rest signal, said reset signal being effectively applied to the direct access storage device;
 (d) removing a protection to the protectable partition to permit the system processor to access the master boot record and the remaining portion of BIOS, the protection being removed in response to the reset signal;
 (e) loading the master boot record into the random access memory, the master boot record including an executable code segment;

(f) transferring control the executable code segment to load the remaining portion of BIOS into the random access memory; and (g) transferring control to the remaining portion of BIOS in the random access memory, the remaining portion of BIOS setting the protection on the protectable partition to prevent unauthorized access to the master boot record and the remaining portion of BIOS stored in the protectable partition on the direct access storage device.

28. The method of claim 27, further including the step (h) of verifying the master boot record is compatible with the system by comparing data stored in the first portion of BIOS with corresponding data stored in the master boot record.

29. The method of claim 27, further including the step (i) of verifying the master boot record is compatible with the system processor by comparing data in the read only memory to corresponding data included in the master boot record.

30. An apparatus for protecting a system resident program in a personal computer system, the personal computer system having a system processor, a random access memory, and at least one direct access storage device capable of storing a plurality of data records, said apparatus comprising:

a first module configured for initializing and testing the system processor;

a second module configured for initializing the at least one direct access storage device to permit access to the data records;

a third module configured for loading data records from the at least one direct access storage device into the random access memory, said third module configured for effecting the loading of a random access memory resident program image being stored in a protectable partition of the at least one direct access storage device, said random access memory resident program image being read from the at least one direct access storage device into the random access memory to produce a random access memory resident program;

means for protecting the protectable partition of the at least one direct access storage device, said means for protecting being activated by said random access memory resident program to prevent unauthorized access to said random access memory resident program image.

31. The apparatus of claim 30, further including a read only memory, said first, second and third module being a portion of said read only memory.

32. The apparatus of claim 30, further including a validation means for confirming the personal computer system is compatible with the random access memory resident program.

* * * * *